Patented July 31, 1934

1,968,089

UNITED STATES PATENT OFFICE 1,968,089

METHOD OF SWEETENING HYDROCARBON DISTILLATES

Jacque C. Morrell, Chicago, Ill., assignor to Universal Oil Products Company, Chicago, Ill., a corporation of South Dakota No Drawing. Application November 11, 1929, Serial No. 406,525

3 Claims. (Cl. 196—33)

This invention relates to the treatment of hydrocarbon oils, such as petroleum distillates and especially to that branch of treatment which is known as "sweetening." The sweetening of petroleum distillates may be defined generally as the removal, or conversion, of mercaptans and hydrogen sulphides. The presence of these compounds imparts to the distillate a bad odor which is objectionable to the user.

In the past, sour distillates have been sweetened by a treatment with sodium plumbite known to the art as "doctor solution." For example, a distillate containing hydrogen sulphide and mercaptans is first water washed to remove a portion of the hydrogen sulphide, then treated with a solution of caustic soda containing litharge dissolved therein. The amount of litharge which will dissolve depends upon the concentration. For example, 10° Baumé caustic solution will dissolve approximately 0.8% litharge; a 16° Baumé caustic solution will dissolve approximately 1% of litharge and 30° Baumé solution will dissolve approximately 3% litharge. The sodium plumbite reacts with the mercaptans to form lead mercaptides. The lead mercaptides may be removed by various means but the one in common practice is to add elementary sulphur which converts the mercaptides to the disulphide and lead sulphide is precipitated. The disulphide is unobjectionable so far as odor is concerned and the distillate is known as "doctor sweet." The hydrogen sulphide present in the distillate is removed by caustic soda or by the plumbite solution.

The treatment of the distillates with litharge in caustic sodium solution in combination with the sulphur treatment generally reduces the color of the distillate and some kinds of distillates, depending upon the source and the kind of mercaptans present, are very difficult to sweeten. For example, gasoline from Panhandle crude, some West Texas crudes, Muskegon crude, and some others require extended blowing or agitation over many hours in order to sweeten and suffer a drop in color of the resulting product.

It is the chief purpose of this invention to reduce the time of sweetening and to obtain a gasoline of good color, in fact to actually improve the color by the simple treatment described herein. In carrying out the invention, the litharge is dissolved in a solution of sodium silicate, or a mixture of sodium silicate and an alkali such as sodium hydroxide. Describing now the preparation of the sodium silicate treating mixture, litharge is added to a solution of sodium silicate, preferably while the solution is hot or the mixture heated and the solution is blown with air or agitated by other means to dissolve the litharge. Blowing with air is beneficial because the carbon dioxide in the air reacts to form some silicic acid which apparently has a beneficial effect in the later treatment. The solution probably contains sodium plumbite or lead silicate or an equilibrium mixture of various combinations of possible lead compounds which have shown some remarkable results in sweetening. Silicic acid may also be present and it is one of the purposes of this invention to actually form some silicic acid by blowing in some carbon dioxide or adding small amounts of dilute acids.

The use of a mixture of borax and sodium silicate containing litharge also has the advantage of reducing substantially the gum content of the gasoline.

Describing now some specific results and the modes of application of the process, a concentrated solution of sodium silicate was saturated while hot with litharge meanwhile blowing with air. The solution was allowed to stand until cool. Upon standing for a week or so, the solution showed a marked tendency to gel showing the formation of silicic acid. A gasoline from Panhandle crude of 17 color Saybolt was treated with the solution using a small amount of sulphur to complete the reaction. Sweetening occurred within ten minutes, whereas with ordinary plumbite solution, about one hour was required for sweetening. The color was increased to 21 Saybolt. A gasoline from Muskegon crude which was extremely difficult to sweeten with ordinary plumbite solution and usually required several hours of blowing with the ordinary plumbite solution and sulphur, was sweetened within one-half hour by the sodium silicate litharge mixture using some elementary sulphur. The color in this case was improved from 17 Saybolt original to plus 24. A gasoline from West Texas crude showed similar results. Treatment with mixtures of sodium silicate and borax plus litharge results in a sweet product of good color and in addition showed a marked reduction in gum content. For example, cracked gasoline so treated was reduced in gum content from 25 mg. to 15 mg., per 100 c. c.

The above examples are cited by way of illustration only and are not to be construed as limitations of the broad spirit and scope of the invention.

I claim:

1. The method of sweetening hydrocarbon distillates containing mercaptans which comprises treating such distillate with a mixture of sodium silicate and litharge containing silicic acid.

2. The method of sweetening hydrocarbon distillates containing mercaptans which comprises treating such distillate with an air-blown mixture of litharge and sodium silicate.

3. The method of sweetening hydrocarbon distillates containing mercaptans which comprises treating such distillate with a mixture of litharge, sodium silicate and borax.

JACQUE C. MORRELL.